May 29, 1923. 1,457,139
A. L. BELL ET AL
FISHING TOOL
Filed July 3, 1922 3 Sheets-Sheet 1
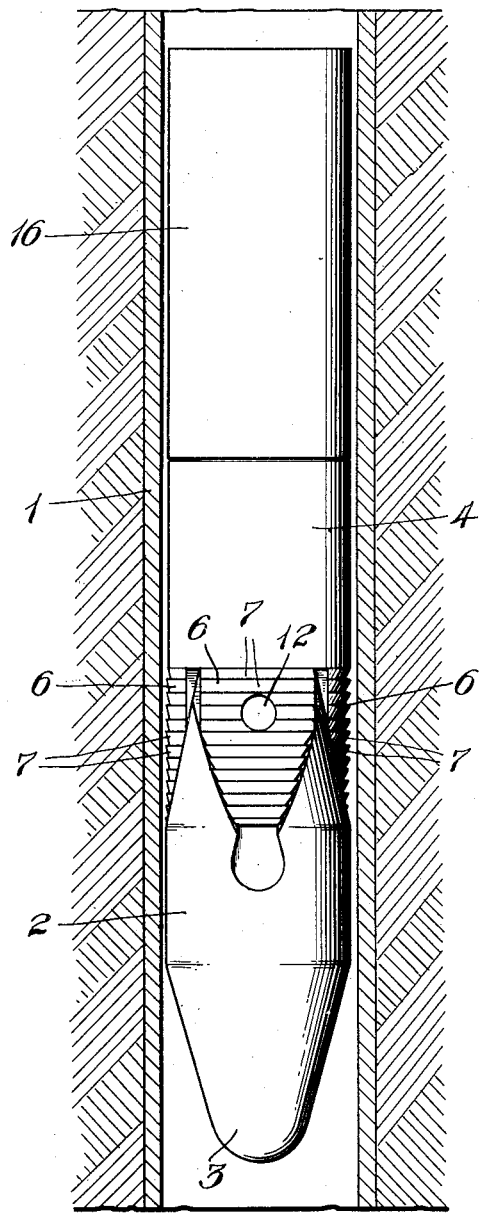
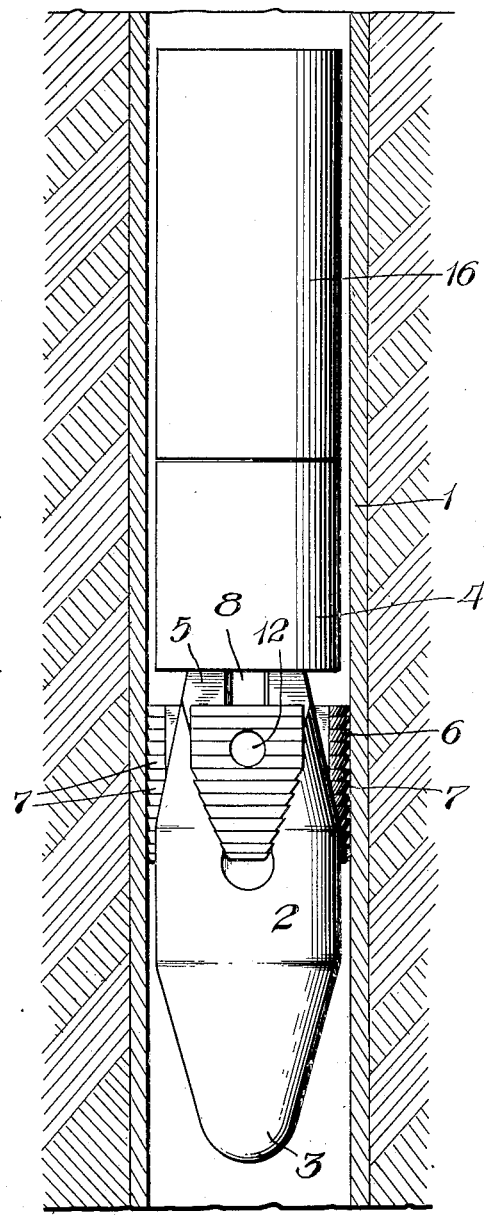
Inventors
Asa L. Bell and
Thomas E. Raines
By Wilkinson & Giusta
Attorneys May 29, 1923.  
A. L. BELL ET AL  
FISHING TOOL  
Filed July 3, 1922 3 Sheets-Sheet 2
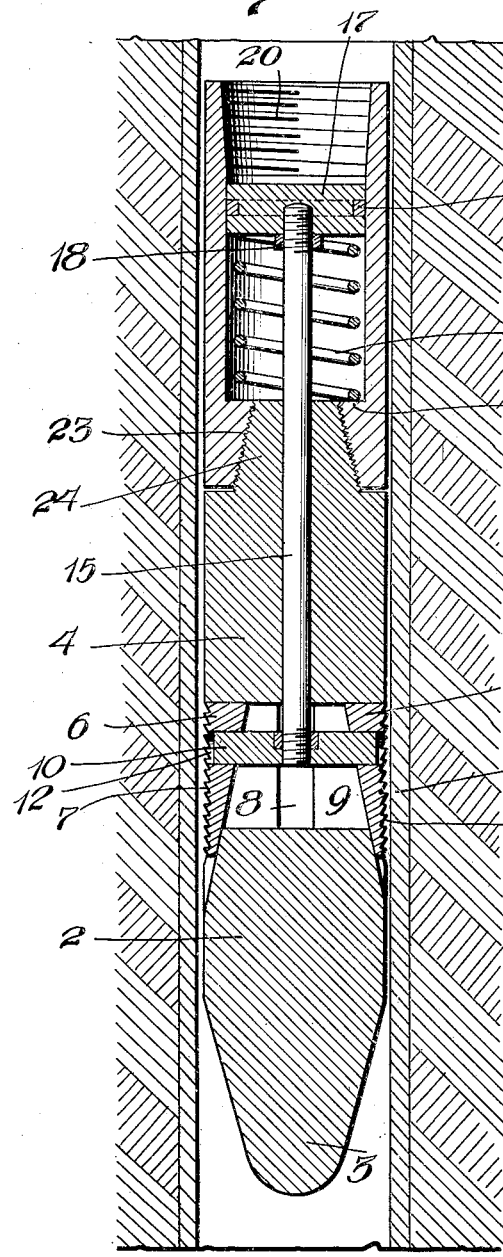
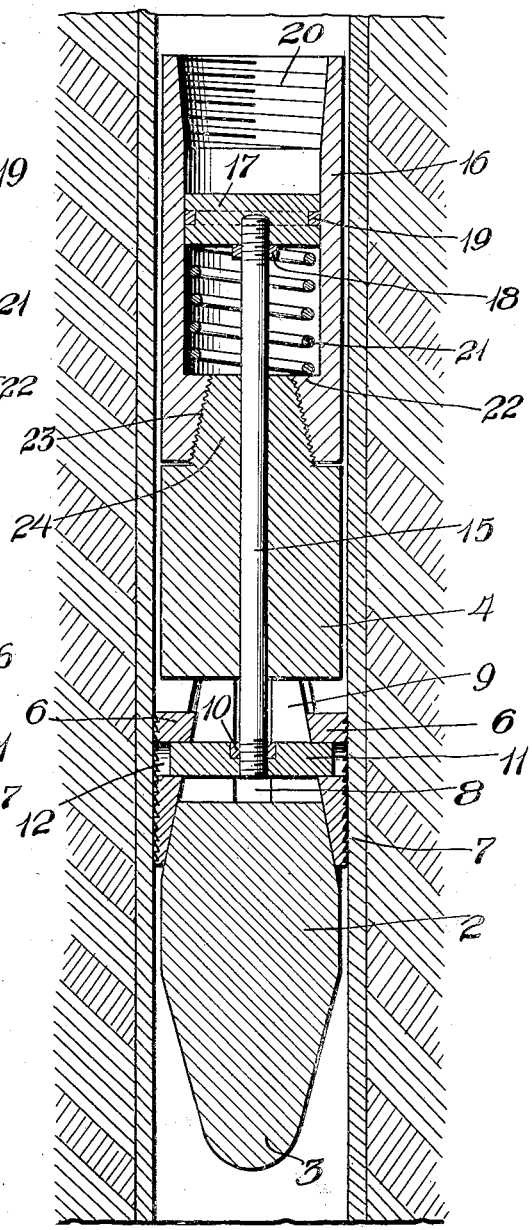
Inventors  
Asa L. Bell  
Thomas E. Raines  
By Wilkinson & Giusta  
Attorneys May 29, 1923.
A. L. BELL ET AL
FISHING TOOL
Filed July 3, 1922     3 Sheets-Sheet 3
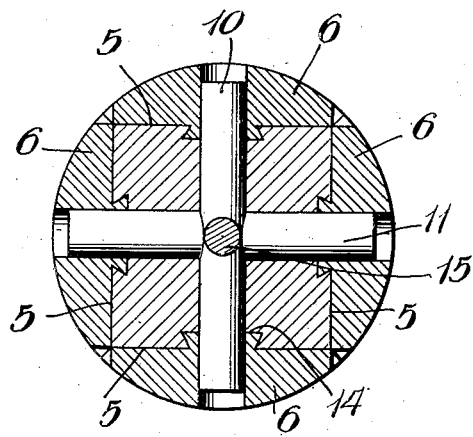
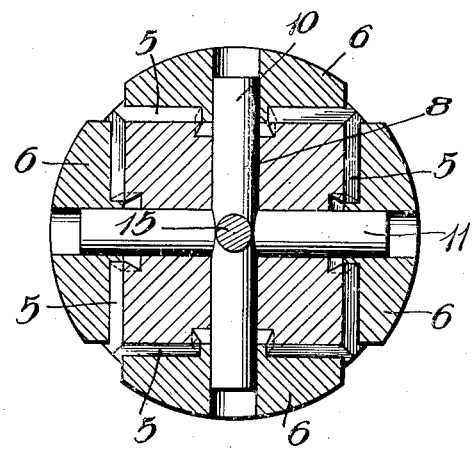
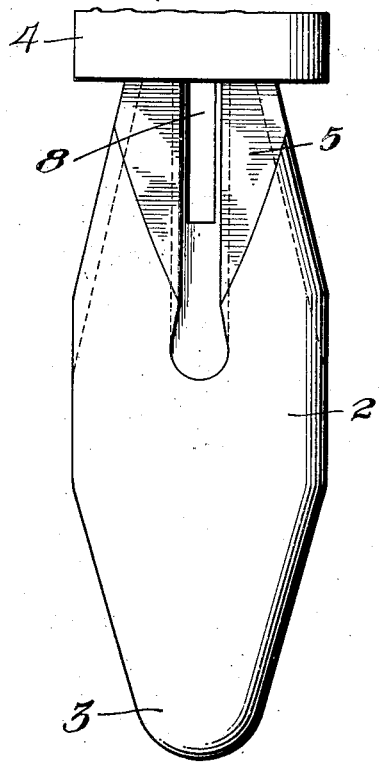
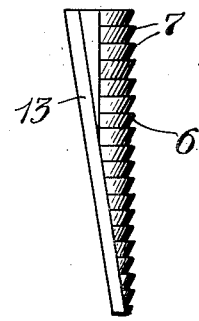
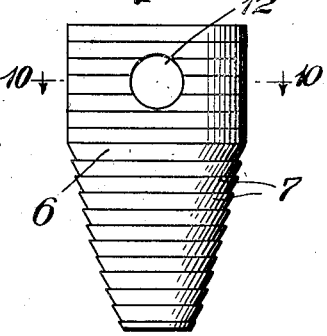
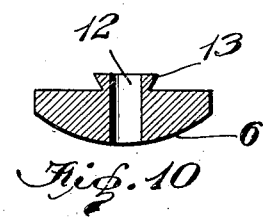
Inventors
Asa L. Bell and
Thomas E. Raines
By Wilkinson & Giusta
Attorneys.

Patented May 29, 1923.

1,457,139

UNITED STATES PATENT OFFICE.

ASA L. BELL AND THOMAS E. RAINES, OF SHREVEPORT, LOUISIANA.

FISHING TOOL.

Application filed July 3, 1922. Serial No. 572,676.

*To all whom it may concern:*

Be it known that we, ASA L. BELL and THOMAS E. RAINES, citizens of the United States, and both residing at Shreveport, in the parish of Caddo and State of Louisiana, have invented certain new and useful Improvements in Fishing Tools; and we do hereby declare the following to be a full, clear, and exact description of the invention, such as will enable others skilled in the art to which it appertains to make and use the same.

The present invention relates to improvements in fishing tools for use in connection with oil wells. A primary object of the invention is to provide a device for use in removing old and broken sections of the well casing or tubing and to accomplish this by the use of expansible gripping jaws so operated and controlled that they may be expanded at any elevation.

Other objects of the invention are to provide a simple and compact construction of fishing tool in which the expansible jaws are operated and contracted by fluid pressure; wherein the parts are subject to ready dismemberment permitting of easy access to the interior construction; wherein the gripping action will be tight and effective and the release to the jaws accomplished quickly, and wherein the device will not be apt to accidentally grip parts of the casing, but the jaws being held in a contracted position except when positively acted upon by the fluid pressure apparatus.

With the foregoing and other objects in view the invention will be described in more particular detail hereinafter in which references will be had to the accompanying drawings.

In the drawings, wherein like parts are denoted by similar symbols throughout the several views.

Figure 1 shows a section through a well having a casing therein and showing in elevation the improved fishing tool in a contracted condition.

Figure 2 is a similar view with the jaws of the tool expanded against the casing.

Figure 3 is a vertical section through a well and also taken through the improved fishing tool with the jaws contracted.

Figure 4 is a similar view showing the expanded condition of the tool.

Figure 5 is a transverse section taken through the jaws and the head together with the operating device and showing the jaws contracted.

Figure 6 is a similar view showing the jaws expanded.

Figure 7 is a fragmentary elevation of the head with the jaws removed.

Figure 8 is an edged view of one of the jaws employed.

Figure 9 is a face view thereof, and

Figure 10 is a section taken on the line 10—10 in Figure 9.

Referring more particularly to the drawings, a well is represented in Figures 1 to 4 having the casing 1 therein extending about the well wall in the usual way.

The improved fishing tool comprises a head 2 of suitable weight and mass and having the pointed or tapered lower end 3 to guide it down centrally therein and to facilitate its entrance. The head is provided with a reduced section at its upper end adjoining the shank 4 and upon this reduced section are provided flat faces 5 in any suitable number to receive the jaws 6. In the instance shown four such jaws are provided to agree with the four flat faces of the reduced head section, but it will be understood that a greater or less number of the jaws may be provided.

The jaws themselves possess inner flat faces to slide upon the faces 5 of the head, it being understood that the faces 5 are inclined as clearly shown in Figures 3 and 5 to admit of the jaws being contracted as illustrated in Figure 3 or expanded as developed in Figure 4. While the inner faces of the jaws are flat the outer faces are properly constructed on curved surfaces in order that, when assembled the jaws may supplement one another and provide a virtually continuous outer cylindrical surface to correspond to the inner wall of the casing 1. To facilitate the gripping action the jaws are provided with teeth 7, such teeth being contracted upwardly and being considerably sharp to bite into the body of the casing.

The reduced section of the head 2 is also provided with slots 8 and 9 which intersect one another at the axis of the head and shank and open out through the central portions of the flat faces 5. These slots are provided to accommodate the pins 10 and 11 which are mortised together at their central overlapping portions as clearly shown in Figures 3 and 4. The outer ends of the pins engage in openings 12 made in the jaws 6, the jaws being free to slide in and out on the ends of the pins for which compare Figures 5 and 6. The jaws are not intended to be held to the head by the pins, but merely move along the flat faces 5, dovetail projections 13 being supplied upon the inner flat faces of the jaws to take into complementally formed slots 14 made in the head along the flat faces 5 and communicating in part with the slots 8 and 9, although the grooves 14 extend outwardly beyond the ends of the slots and are open at their extreme lower ends to admit of the removal of the projections 14. In this way substitute jaws may be furnished to take the place of those broken or worn out.

At the central parts of the pins 10 and 11 where they intersect, is secured as by screwing a plunger rod 15 slidably mounted axially through the shank 4 and passing up into a cylinder 16 in which reciprocates a piston 17. The piston is also threaded centrally to receive the upper threaded end of the rod 15, a lock nut 18 being run upon the rod and against the lower face of the piston to avoid the backing of the piston off the rod. The piston is provided with an outer groove in which is placed a piston ring 19 of appropriate construction to avoid leakage. Fluid pressure is adapted to have controlled access to the top of the plunger 17 and for this purpose the cylinder 16 is provided with an internal thread 20 at its upper end which is preferably tapered to receive the pipe or tube. A coil spring 21 is interposed below the piston 17 and above the shoulder 22 upon the base of the cylinder, which is provided with a tapered and threaded opening 23 to receive the frusto-conical boss 24 extending beyond the upper end of the shank 4.

In operation, the parts are normally in the position shown in Figures 1 and 3 in which the jaws 6 are contracted against the lower end of the shank 4. In this position they are spaced from the casing 1. This position is preserved by the action of the coil spring 21 which elevates the plunger 17.

The parts in this position are lowered into the well by the use of tubing or pipe attached to the upper threaded end of the cylinder 16. When the tool arrives at the proper depth, the fluid pressure is turned into the pipe or tube and acts to drive the plunger 17 down into the center and compresses the spring 21. The plunger rod and the pins 10 and 11 are also shifted by this movement which causes the jaws 6 to ride outwardly upon the inclined faces 5 wedging the teeth 7 into the casing. The tool is then lifted and this lifting action will tend to cause the jaws to ride down further upon the faces 5 creating a more firm binding engagement and the weight of the casing as it is taken up will further assist this action so that the gripping will not be apt to loosen.

As soon as the fluid pressure is cut off, a spring 21 will again lift the parts to the original position and release the tool from the casing. It will be appreciated from the foregoing that we have provided an exceedingly compact yet efficient tool for the purpose stated, very easy access being had to the various parts for replacement and repair.

We desire it to be understood that we reserve the right to make such modifications and changes in the constructions, combinations and arrangements of parts as fall fairly within the scope of the following claims.

What we claim is:—

1. A fishing tool comprising a head, expansible jaws carried by the head, and fluid pressure means connected to the head and the said jaws for expanding the latter, substantially as described.

2. A fishing tool comprising a head having inclined faces, jaws slidable, on the inclined faces, and fluid pressure means to cause the sliding and expanding of the jaws, substantially as described.

3. A fishing tool comprising a head, jaws sliding thereon, a cylinder connected to the head, a piston therein adapted to be acted on by fluid pressure and connected to the jaws, and means to shift the piston and connected jaws in the opposite direction when the fluid pressure is released, substantially as described.

4. A fishing tool comprising a head having a reduced section with inclined faces, jaws slidable on the faces, means in the reduced section for limiting the movement of the jaws and for causing the movement thereof, and fluid pressure means acting through said last-named means to expand the jaws along the inclined faces, substantially as described.

5. A fishing tool comprising a head having inclined faces and a shank, jaws moving over the inclined faces, a cylinder connected to the shank, a fluid pressure piston therein, and means connecting the piston with the jaws, substantially as described.

6. A fishing tool comprising a head having a reduced shouldered section with inclined flat faces and intersecting slots, jaws movable on the faces and having means to hold the jaws in place, pins in the slots slidingly connected to the jaws, and fluid pressure means to actuate the jaws, substantially as described.

ASA L. BELL.
THOMAS E. RAINES